Inventor:
Robert Nash Burckhalter

April 13, 1937.　　　R. N. BURCKHALTER　　　2,076,934
OIL FILTER
Filed Aug. 3, 1934　　　3 Sheets-Sheet 2
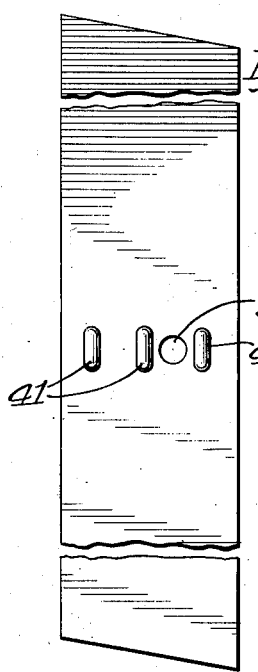
Fig. 7
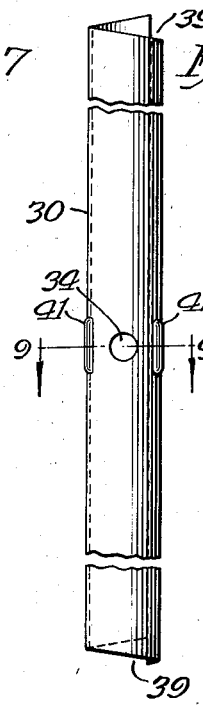
Fig. 8
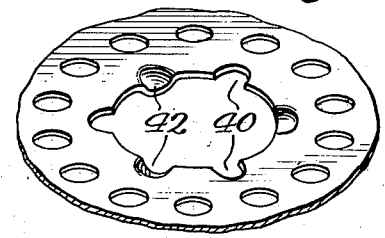
Fig. 10
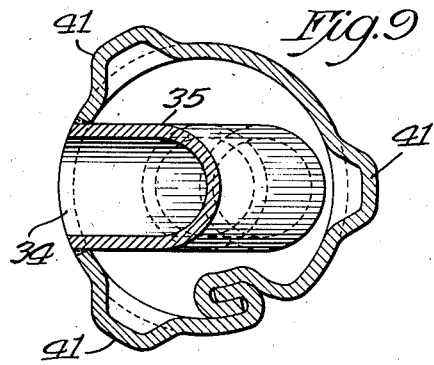
Fig. 9
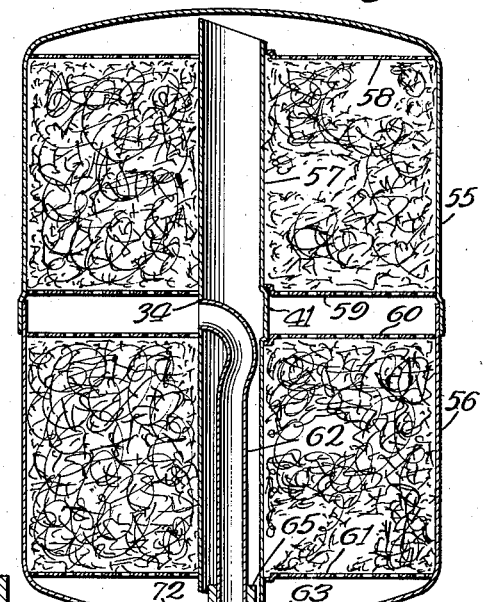
Fig. 11
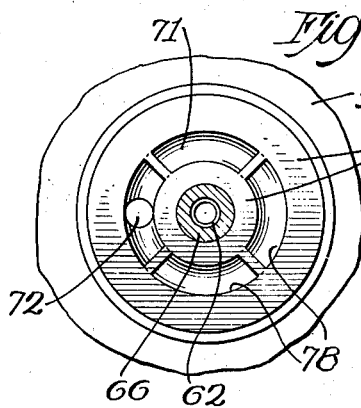
Fig. 12
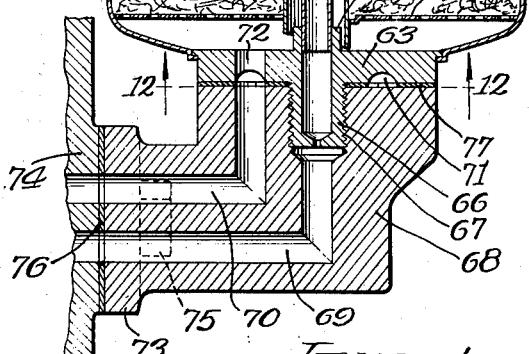
Inventor:
Robert Nash Burckhalter
By Wilson, Mann & Co.
Attys.

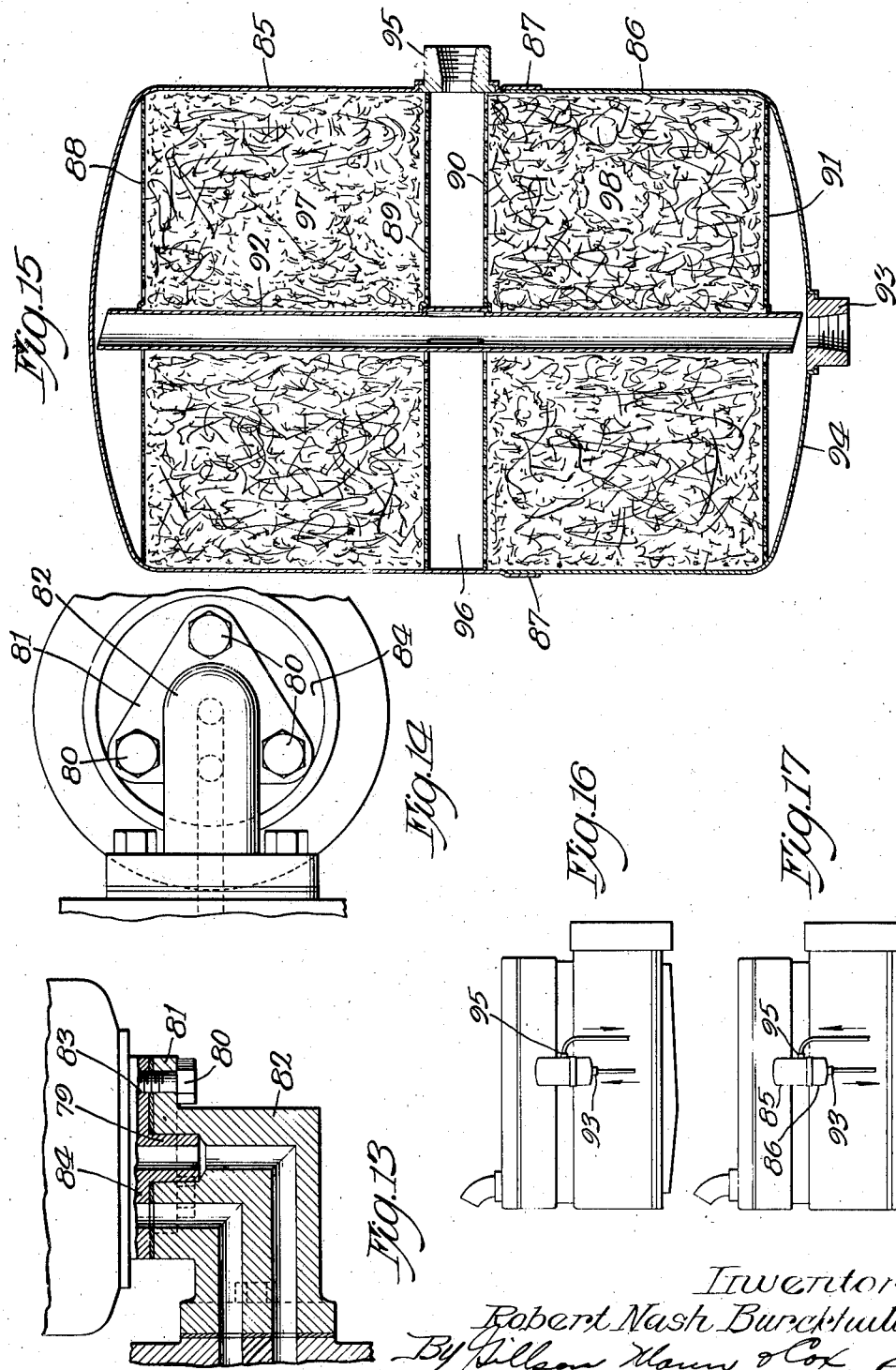

Patented Apr. 13, 1937

2,076,934

UNITED STATES PATENT OFFICE 2,076,934

OIL FILTER

Robert Nash Burckhalter, Michigan City, Ind., assignor to Michiana Products Corporation, Michigan City, Ind., a corporation of Indiana Application August 3, 1934, Serial No. 738,305

9 Claims. (Cl. 210—134)

This invention relates to filters, and has for its principal object to provide a simple and cheap construction affording generous surface area and thickness of filtering material in a small casing that can be readily installed in various lubricating systems of automotive engines, and can be easily replaced with a new one after a suitable tour of service.

The gist of the invention, however, may be applied to other uses and the filtration of liquids in general.

Fig. 7 is a plan view of a blank;

Fig. 8 is a plan view of a tube made by rolling the blank of Fig. 7;

Fig. 9 is a cross section taken on the line 9—9 of Fig. 8;

Fig. 10 is a perspective view of a portion of one of the disks or heads used in making the filter of Fig. 1;

Fig. 11 is a lengthwise section through another form of filter including a base adapted to be bolted to the engine casing;

Fig. 12 is a sectional view taken on the line 12—12 of Fig. 11;

Fig. 13 is a sectional view of an alternative form of base, and portions of the filter and engine casing;

Fig. 14 is an inverted plan view of Fig. 13;

Fig. 15 is a lengthwise section of a simplified form of filter.

Figs. 16 and 17 are diagrams indicating how the filter of Fig. 15 may be installed on an engine.

These several forms are used to illustrate how the invention may be applied but are not intended to indicate the scope of the claims.

Figure 1:
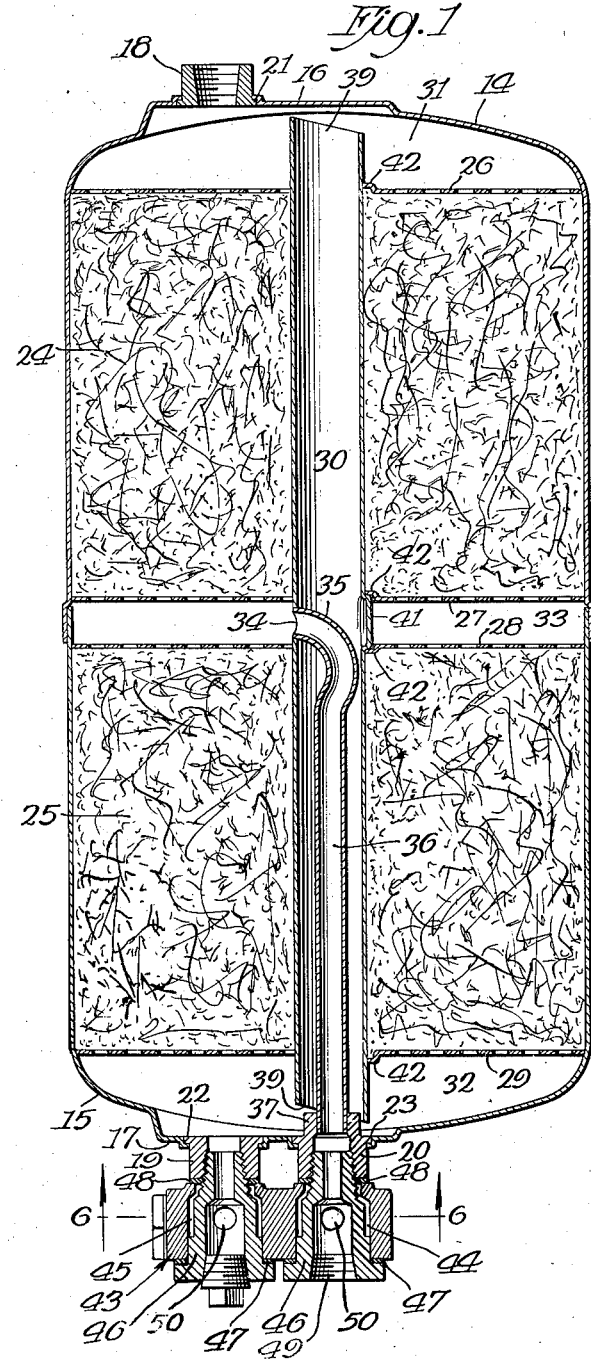
Fig. 1 is a lengthwise section through one embodiment of the invention.

The filter shown in Fig. 1 is contained within a cylindrical barrel or casing composed of like sections 10, 11, telescoped and sweated together at 12, one wall being offset at 13 for that purpose.

The ends 14 and 15 of the casing are spherical or dome shaped, formed up flat at 16 and 17 to receive nipples 18, 19 and 20, which are received in and sweated to flanged seats 21, 22 and 23 respectively.

The casing contains two separate filter elements 24 and 25, filling the entire cross section of the end portions, and confined between perforated disks or heads 26, 27, 28 and 29, arranged crosswise to the casing and extending from its outer wall to a central tube 30, running practically from one end to the other of the casing.

The heads 26 and 29 are located at about the junction between the cylindrical wall and the respective dome shaped heads 14 and 15, and with those heads form end chambers or vestibules 31 and 32, serving to distribute or collect oil depending upon how the filter is connected in the system.

The heads 27 and 28, at adjacent ends of the two filter elements 24 and 25, are spaced apart to form an intermediate or middle chamber 33, which also serves to collect or distribute oil, according to the way the filter is connected in the system.

The tube 30 has a hole 34 in communication with the chamber 33 and to which is soldered the curved end portion 35 of a smaller tube 36, the opposite end of which is sweated into the flange 37 of the nipple 20.

Figure 2:
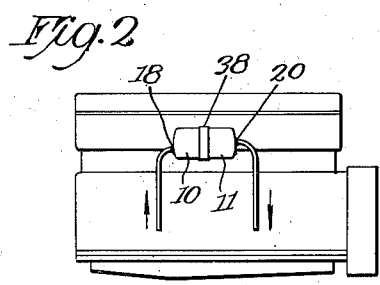
Figs. 2, 3, 4, 5, are diagrammatic views illustrating how the filter shown in Fig. 1 may be installed in a lubricating system of an engine.

Fig. 2 shows the filter of Fig. 1 with the nipple 18 as an inlet and the nipple 20 as an outlet, the nipple 19 being plugged. In that case oil enters chamber 31, at the top of Fig. 1, and divides into two streams; one distributed through the perforations in the head 26, passes through the filter element 24 to the chamber 33, thence through the hole 34 and the tube 36 to the nipple 20; the other stream passes from the chamber 31 down through the tube 30 to the chamber 32 where it is distributed through the perforations in the head 29 and passes through the filter element 25 to the chamber 33 where it joins the other stream at the hole 34 and passes out through the tube 36 and the nipple 20.

Figure 3:
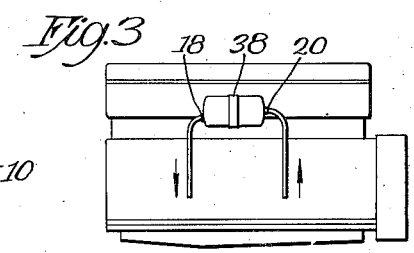

Fig. 3 shows the nipple 20 as the inlet and nipple 18 as the outlet, and the flow is substantially the reverse of that just described.

Figure 4:
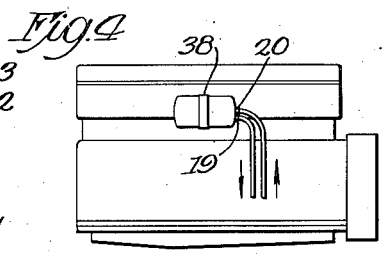

Fig. 4 shows nipple 20 as the inlet and nipple 19 as the outlet. In that case oil passes through the tube 36 out the opening 34 into the chamber 33, where it divides; one part passing through the filter element 24 to the chamber 31, thence through the tube 30 to the chamber 32, where it joins the other stream, which has in the meantime passed from the chamber 33 through the element 25 to the chamber 32 and the joined streams escape through the nipple 19.

Figure 5:
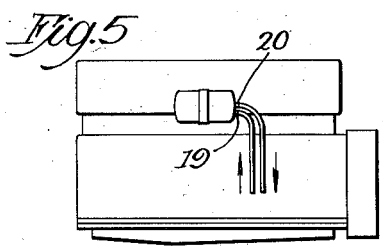

Fig. 5 shows nipple 19 as the inlet and nipple 20 as the outlet and the flow is substantially the reverse of that described in connection with Fig. 4.

Figs. 2, 3, 4 and 5 show the filter in a horizontal position held by a clamp 38. It might also be in a vertical position or any other, and these figures are intended merely to show one selection as to mounting, and four selections as to connections.

The nipples 18 and 19 are both at one side of the center, while the nipple 20 is in the center. This has the advantage that instructions to always connect the center nipple and one of the others will be fool-proof.

The division of the liquid into two streams through separate and independent filter elements allows the speed to be cut in half and, in effect, doubles the capacity of the filter.

In this illustration of Fig. 1 the sections 10 and 11 of the casing are made of 22 gauge sheet steel 4⅛" outside diameter and 4 3/32" long, and they are telescoped for 1/16". The tube 30 is made of 26 gauge sheet steel and is 7 13/16" from the tip of one beveled end 39 to the other, the beveled ends insuring clearance for free oil flow.

The heads 26, 27, 28, 29, are of 26 gauge sheet steel with ⅛" holes and are 3 31/32" in diameter. They are provided (or the heads 27, 28, at least) with three notches 40 to pass over ribs 41 on the tube 30, which are about 1/16" in height and ⅜" in length, spaced 120° apart. The heads 27 and 28 are also provided with depressions 42 to bear against the ends of the ribs 41 when assembled, as shown in Fig. 1.

The tube 36 is of copper ¼" outside diameter, the nipples are of brass and have pipe threads.

The filter elements 24 and 25 are composed of shredded cotton, wool, a mixture of wool and cotton, or cattle hair and cotton, or cattle hair and asbestos fiber, or cotton and mineral wool, or various other fibrous materials that will be selected according to the particular filtration to be done. The density will be about right for lubricating oil used in automotive engines when the heads are assembled with enough pressure to develop a small amount of resiliency in the filtering material.

Preferably the limiting restriction in the system will be on the outlet side of the filter to protect it against clogging, but it may in some instances be on the inlet side of the filter.

Figure 6:
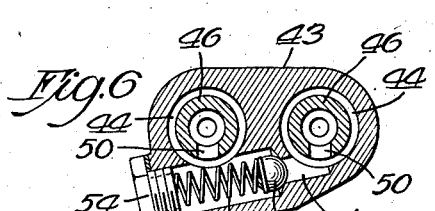
Fig. 6 is a section taken on the line 6—6 of Fig. 1.

When it is desired to have a bypass across the filter shown in Fig. 1, that may be accomplished by the simple attachment shown at the bottom of Fig. 1, and in section in Fig. 6. A bypass casing 43 is provided with two similar transverse bores 44 and 45, adapted to receive threaded fittings 46 which, being screwed into the nipples 19 and 20, clamp the casing in place and put pressure on the gaskets 47 and 48 to seal the respective joints. The fittings 46 have longitudinal bores threaded at 49 to function as nipple connections, and also transverse bores 50 communicating with a bypass bore 51, controlled by a ball valve 52, held seated by a spring 53 compressed by a cap 54. The pressure of the spring will determine the pressure differential on the filter elements, and the material described will stand a high pressure as compared with ordinary felt filters and flannel filters.

The bypass provided by this attachment will function the same in any of the connections described.

When it is desired to mount the filter on a base adapted to be bolted to an engine casing, or the like, constructions similar to those illustrated in Figs. 11, 12, 13 and 14 may be used.

In this instance the casing sections 55 and 56 the central tube 57, the perforated heads 58, 59, 60, 61, and the curved tube 62 are quite similar to those shown in Fig. 1, except the proportions have been altered, and the nipples 18, 19 and 20 have been replaced by a single large nipple 63, sweated in a seat 64 in the casing section 56 and having a flange 65 sweated to the end of the tube 62.

On the lower side of the nipple 63 there is a hollow screw threaded stud 66 adapted to be threaded into a corresponding opening 67 in a bracket 68, having an angular passage 69, one portion of which is aligned with the bore of the stud 66. The bracket also has an angular passage 70, one portion of which lies alongside the stud 66 and communicates with an annular groove 71 on the bearing face of the nipple 63 and a hole 72 leading through the nipple into the filter casing.

The bracket has a flange 73 machined to fit against a pad 74 on the engine casing and be held in place by bolts 75, the joint being sealed by a gasket 76. The filter is assembled with the bracket by threading the stud 66 into the opening 67 of the bracket until sealing pressure is put on a gasket 77, which has arcuate slots 78, one or more of which will establish communication between the passage 70 and the hole 72.

In the alternative form shown in Figs. 13 and 14 the stud 79 corresponding to the stud 66 is not threaded and the parts are held together by three bolts 80 passing through a flange 81 on a bracket 82, and into threaded bores 83 of the nipple 84. Otherwise the construction is the same.

In Fig. 15 the filter casing is made of two dissimilar parts 85 and 86, telescoped and sweated together at 87. The heads 88, 89, 90 and 91, and the tube 92, correspond to the similar parts shown in Fig. 1, except that there is no hole corresponding to that shown at 34 in Fig. 1.

A single nipple 93 is fitted in one end 94 of the casing and another nipple 95 is fitted in the side and communicates with an intermediate chamber 96 between the heads 89 and 90. There are two filter elements 97 and 98, corresponding to those shown at 24 and 25 in Fig. 1. This produces an extremely simple construction that will give ample filtration for many conditions. It may be connected with either nipple as an inlet and the other as an outlet, as illustrated diagrammatically in Figs. 16 and 17.

A single clamp, beneath the side nipple 95, as shown, makes a very secure mounting. The fibrous material forming the filter elements, is in loose, open condition, readily permeated by the oil. Fine solid matter, such as colloidal carbon, enters the mass and, after extended use, passes out with the oil, which marks the end of service and the need of replacement.

The 1/16" restriction opening is made a part of the stud 66 in Fig. 11, and might be in one nipple of each form.

All of the perforated heads or disks are shown with notches 40 and depressions 42 to make them usable in any position for convenience in assembling. That operation is somewhat a matter of choice. With the form shown in Fig. 1 that procedure may be as follows:

Secure the lower end of the tube 36 to the flange 37, as by sweating or spinning and sweating, solder the curved end 35 in the hole 34 of the tube 30, insert the head 29 in the section 11 and over the tube 30, fill in the fibrous material forming the filter element 25, distributing it uniformly. Put the head 28 on the tube 30 with the notches 40 aligned with the ribs 41, push it down below the position shown in Fig. 1, and rotate it to bring the depressions 42 in line with the ribs 41 and release it. The pressure will be about right with shredded cotton, which is the preferred material, when there is sufficient resiliency to hold the head in the position shown in Fig. 1.

Bring the head 27 in the position shown in Fig. 1, insert the head 26 in the section 10 and enter the upper end of the tube 30 at the central opening of the head 26 just a little way, tilt the section 10 towards the left in Fig. 1, and insert the fibrous material forming the filter element 24, distributing it uniformly. Bring the section 10 to the position shown in Fig. 1 and sweat the two sections together at 12.

The form shown in this Fig. 1 is a little longer than is necessary. Approximately two inch depth of filter material, particularly shredded cotton, is sufficient for a long period of service.

The form shown in Fig. 11, which is much smaller than that shown in Fig. 1, has been found satisfactory for engines where the flow of oil is not great.

The form shown in Fig. 15 is about the size best suited for the average small engine.

The exact size will depend somewhat upon the conditions. As a general rule the best results will be had when the unit pressure is low and the flow is slow. In the form shown in Fig. 1 with the bypass set for a pressure differential of three and one-half (3½) pounds per square inch is very satisfactory. A lower differential would contribute to more thorough filtering. A little cut and try will indicate the proper relations, whether a bypass or a limiting restriction is used.

I claim as my invention—

1. An oil filter comprising a casing having a pair of openings for the admission and discharge of oil, a pair of spaced apart filtering elements one within each end portion of the casing and being of equal cross section therewith and spaced from the casing end, a tube connecting the end spaces of the casing and a smaller tube within said tube connecting one of the openings with the space between the filtering elements.

2. In a filter, a supporting bracket having a bearing face for a casing and outlet and inlet ducts opening through such face, one thereof being central, a casing having a bearing plate for seating against the bracket face and provided with one hole alined with the central duct, a second hole for communication with the companion bracket duct and an annular groove in the face of the plate crossing said last-named hole, a filtering element within the casing and means for securing the bearing plate to the bracket.

3. A filter comprising a barrel, a filter element occupying each end portion and confined thereto by perforated heads crosswise to the barrel, the two adjacent being separated, a tube extending lengthwise to the barrel through the heads and having a lateral opening between those adjacent, and a tube connecting said opening with the exterior of the barrel.

4. An oil filter comprising a cylindrical casing, a tube in the casing placing the end portions in communication and having enlargements about its mid-portion, perforate heads mounted on the tube adjacent the end portions of the casing, and other heads mounted on the tube, spaced apart by said enlargements and engaging the casing to cooperate with the end heads to form filter chambers, the casing having an opening communicating with the space between said chambers and another opening in one of the end portions.

5. An oil filter comprising a cylindrical casing having dome-shaped ends, a tube in the casing placing the spaces within the domes in communication with each other and having enlargements about its mid-portion, perforate heads mounted on the tube adjacent the ends thereof and seated in and positioned by the dome-shaped end portions of the casing, and other heads mounted on the tube, spaced apart by said enlargements and engaging the casing to cooperate with the end heads to form filter chambers, the casing having an opening communicating with the space between said chambers and another opening in one of the end portions.

6. A filter comprising a barrel having a central opening and a lateral opening at one end and an opening at the other end, a filter element occupying each end portion of the barrel and confined thereto by perforate heads crosswise of the barrel, the two adjacent being separated, means for directing flow through the filter and the central opening and one of the selected other openings comprising a tube extending lengthwise to the barrel through the heads and having a lateral opening between those adjacent, and a tube connecting said last named lateral opening with the end opening of the barrel, and a bypass across the filter connecting the central and lateral openings at one end.

7. An oil filter comprising a cylindrical casing, a tube in the casing placing the end portions in communication and having enlargements about its mid-portion, perforate heads mounted on the tube adjacent the end portions of the casing, and other heads mounted on the tube, spaced apart by said enlargements and engaging the casing to cooperate with the end heads to form filter chambers, one end of the casing having a central opening communicating with the space between said chambers and having a lateral opening, and the other end of the casing having an opening, and a bypass across the filter and connecting the central and lateral opening at one end.

8. In a filter, a supporting bracket having a bearing face for a casing and outlet and inlet ducts opening through such face, one thereof being central, a casing having a bearing plate for seating against the bracket face and provided with one hole alined with the central duct, a second hole for communication with the companion bracket duct and an annular groove in the face of the plate crossing said last-named hole, a filter element occupying each end portion of the casing and confined thereto by perforated heads crosswise to the casing, the two adjacent being separated, a tube extending lengthwise to the casing through the heads and having a lateral opening between those adjacent, and a tube connecting said opening with the exterior of the casing.

9. In a filter, a supporting bracket having a bearing face for a casing and outlet and inlet ducts opening through such face, one thereof being central, a casing having a bearing plate for seating against the bracket face and provided with one hole alined with the central duct, a second hole for communication with the companion bracket duct and an annular groove in the face of the plate crossing said last-named hole, a tube in the casing placing the end portions in communication and having enlargements about its mid-portion, perforate heads mounted on the tube adjacent the end portions of the casing, and other heads mounted on the tube, spaced apart by said enlargements and engaging the casing to cooperate with the end heads to form filter chambers, a filtering element within each filter chamber, and means for securing the bearing plate to the bracket, the casing having an opening communicating with the space between said filter chambers and another opening in one of the end portions.

ROBERT NASH BURCKHALTER.